(12) United States Patent
Mori

(10) Patent No.: US 11,496,637 B2
(45) Date of Patent: Nov. 8, 2022

(54) IMAGE PROCESSING APPARATUS, METHOD OF CONTROLLING THE SAME, AND STORAGE MEDIUM

(71) Applicant: Canon Kabushiki Kaisha, Tokyo (JP)

(72) Inventor: Yusuke Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/350,120

(22) Filed: Jun. 17, 2021

(65) Prior Publication Data

US 2021/0400153 A1 Dec. 23, 2021

(30) Foreign Application Priority Data

Jun. 17, 2020 (JP) .............................. JP2020-104746

(51) Int. Cl.
*H04N 1/00* (2006.01)
(52) U.S. Cl.
CPC ....... *H04N 1/00477* (2013.01); *H04N 1/0048* (2013.01); *H04N 1/0097* (2013.01); *H04N 1/00474* (2013.01); *H04N 2201/0094* (2013.01)
(58) Field of Classification Search
CPC ........... H04N 1/00477; H04N 1/00474; H04N 1/0048; H04N 1/0097; H04N 2201/0094

USPC ........................................................ 358/1.15
See application file for complete search history.

(56) References Cited

U.S. PATENT DOCUMENTS

| | | | | |
|---|---|---|---|---|
| 2011/0242024 A1* | 10/2011 | Fukumoto | ......... | H04N 1/00411 345/173 |
| 2015/0248092 A1* | 9/2015 | Takahashi | ............ | G06Q 20/085 399/79 |
| 2018/0084122 A1* | 3/2018 | Kamoi | ............... | H04N 1/00389 |
| 2018/0097946 A1* | 4/2018 | Kirihara | ............. | H04N 1/00514 |
| 2019/0187948 A1* | 6/2019 | Dommaraju | ........ | G06F 11/0766 |

FOREIGN PATENT DOCUMENTS

JP 2011210009 A 10/2011

* cited by examiner

*Primary Examiner* — Neil R McLean
(74) *Attorney, Agent, or Firm* — Venable LLP

(57) ABSTRACT

The image processing apparatus comprises a display unit 120 configured to display an operation screen and acquires information related to a job execution button included in the operation screen and acquires current status information of the image processing apparatus. Also, the image processing apparatus, based on the acquired information related to the execution button and status information, determines execution capability of the execution button. Furthermore, the image processing apparatus controls based on the determination result the display of each execution button included in the operation screen such that the execution capability status is recognizable.

17 Claims, 8 Drawing Sheets

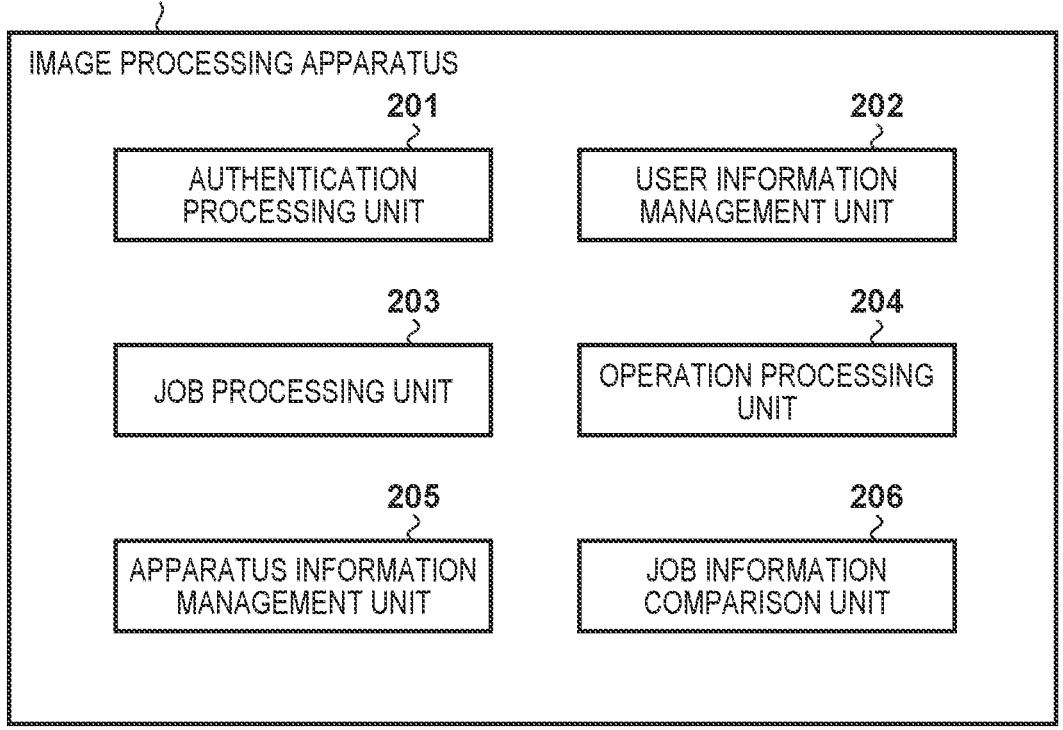
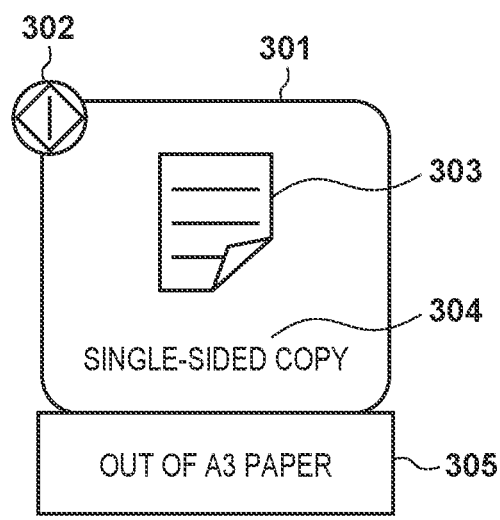

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus that has an operation unit, a method of controlling the same, and a storage medium.

Description of the Related Art

In image processing apparatuses, a menu screen that includes buttons for executing functions such as copying and scanning that the apparatus provides is presented in an operation unit after a user logs in to the apparatus. The user can instruct setting or execution of a function by pressing an execution button on the menu screen. For example, Japanese Patent Laid-Open No. 2011-210009 proposes displaying a large number of buttons such as a button for selecting a copy mode and a button for collectively or individually selecting a transmission-type mode on a screen for when a user logs in to an image processing apparatus. Also, presenting a status of an image processing apparatus to a user is known as a typical technique. For example, in a case of displaying status information on a home screen, the user can determine whether or not a job scheduled for instruction can be executed by confirming the status information.

However, the conventional technology described above has the problems described below. For example, in the conventional technology described above, the relationship of each execution button and status information is not clear when the status information is presented. Accordingly, the user needs to perform the determination of whether or not a button can be executed based on the status information with an understanding of the execution content of a job associated with each execution button. In other words, how the status information of an apparatus displayed on an operation screen is related to an operation button on the screen is not clearly presented; accordingly, the user cannot easily determine whether or not a predetermined execution button is executable.

SUMMARY OF THE INVENTION

The present invention enables realization of a mechanism for suitably indicating on an operation screen an execution capability status of a button for executing a function.

One aspect of the present invention provides an image processing apparatus comprising: a display unit configured to display an operation screen; at least one memory device that stores a set of instructions: and at least one processor that executes the set of instructions to: acquire information related to a job execution button included in the operation screen and acquire current status information of the image processing apparatus, determine, based on acquired information related to the execution button and the status information, an execution capability of the execution button, and control, based on a determination result, display of each execution button included in the operation screen such that an execution capability status is recognizable.

Another aspect of the present invention provides a control method of an image processing apparatus that comprises a display unit configured to display an operation screen, the method comprising: acquiring information related to a job execution button included in the operation screen and acquiring current status information of the image processing apparatus; determining, based on acquired information related to the execution button and the status information, an execution capability of the execution button; and controlling, based on a determination result, display of each execution button included in the operation screen such that an execution capability status is recognizable.

Still another aspect of the present invention provides a non-transitory computer-readable storage medium storing a computer program for causing a computer to execute each step in a control method of an image processing apparatus that comprises a display unit configured to display an operation screen, the control method comprising: acquiring information related to a job execution button included in the operation screen and acquiring current status information of the image processing apparatus; determining, based on acquired information related to the execution button and the status information, an execution capability of the execution button; and controlling, based on a determination result, display of each execution button included in the operation screen such that an execution capability status is recognizable.

Further features of the present invention will become apparent from the following description of exemplary embodiments (with reference to the attached drawings).

BRIEF DESCRIPTION OF THE DRAWINGS

FIG. 2 is a block diagram illustrating an example of a function of the image processing apparatus 1 according to the embodiment.

FIG. 3 is a schematic diagram illustrating an example of an execution button according to the embodiment.

DESCRIPTION OF THE EMBODIMENTS

Figure 1:
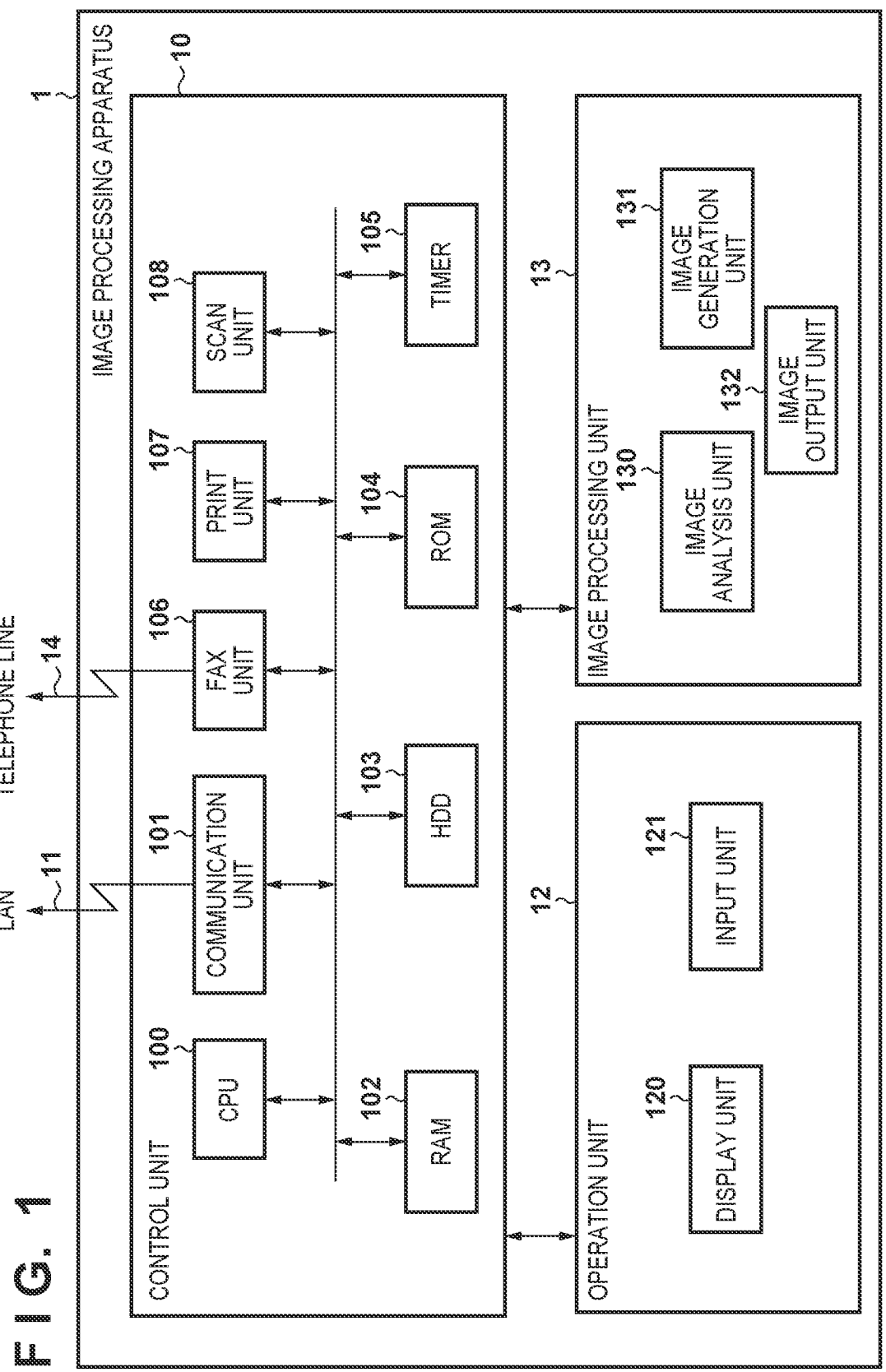
FIG. 1 is a block diagram describing a configuration of an image processing apparatus 1 according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Image Processing Apparatus Configuration>

A first embodiment of the present invention will be described below. First, a configuration of an image processing apparatus 1 according to the present embodiment will be described with reference to FIG. 1. The image processing apparatus 1 comprises a control unit 10, an operation unit 12, and an image processing unit 13.

The control unit 10 performs control of operation of each unit of the image processing apparatus 1. The control unit 10 comprises a CPU 100, a LAN (Local Area Network) 11, a communication unit 101, a RAM 102, an HDD 103, a ROM 104, a timer 105, and a FAX unit 106. The CPU 100 controls the entire control unit 10. The RAM 102 provides a system work memory for the CPU 100 to operate. The HDD 103 is a hard disk drive and may also be a storage medium such as a magnetic disk, optical media, or a flash memory. The HDD 103 can store document data, setting data, and the like. Also, the HDD 103 does not need to be provided within the image processing apparatus 1. In such a case, the HDD 103 may be provided as an external HDD, or an external server, PC, or the like may be used as a data storage apparatus via the communication unit 101 in place of the HDD 103. The ROM 104 is a boot ROM and stores a system boot program. The CPU 100 deploys in the RAM 102 a program that is installed in the HDD 103 using a boot ROM of the ROM 104 and performs various kinds of control based on that program. The timer 105 performs measuring of a period of time in accordance with instruction of the CPU 100 and notifies the CPU 100 by interruption or the like when the instructed period of time elapses. The LAN 11 represents a network for performing exchange of data to and from an external apparatus, and the image processing apparatus 1 is connected to the Internet via this LAN 11. The LAN 11 may be of either form of a wired LAN or a wireless LAN. The communication unit 101 performs transmission/reception of data via the LAN 11. The FAX unit 106 performs transmission/reception of FAX data via a telephone line 14. A print unit 107 performs a print job of sheets that have been set in a case where there is a print instruction. The print unit 107 comprises a cassette in which sheets are set, a unit for setting apparatuses that are necessary for printing such as a toner cartridge or an ink cartridge, and the like. Also in the print unit 107, confirmation of whether or not there is a lack of a consumable or the like that is necessary for printing such as a paper shortage or a toner/ink shortage is accomplished by providing a sensor (e.g., a sheet detection sensor, a remaining toner quantity detection sensor) in each unit. The sheet detection sensor is provided in each sheet feeding cassette and is a sensor that can detect the number of sheets stacked in each sheet feeding cassette. For example, sheet detection sensor is a sensor that detects the number of sheets by measuring the height of the stacked sheets. Also, the remaining toner quantity detection sensor is a sensor that detects the remaining amount of toner and is provided for each cartridge of the respective colors. A scan unit 108 performs a scan operation of a sheet that has been set in a case where there is a scan instruction. The scan unit 108 comprises a sheet setting unit and a sheet data read unit. Also in the scan unit 108, a sensor is provided in each unit and confirmation of whether or not there is a lack of consumables and the like that are necessary for scanning such as paper shortage or toner/ink shortage is performed.

The operation unit 12 is controlled by the control unit 10 and comprises a display unit 120 and an input unit 121. The display unit 120 is a display for displaying information of the image processing apparatus in relation to the user and is, for example, a touch panel-type liquid crystal display. The input unit 121 accepts an operation input and the like from the user via interfaces such as a touch panel, a mouse, a camera, voice input, and a keyboard.

The image processing unit 13 is controlled by the control unit 10 and comprises an image analysis unit 130, an image generation unit 131, and an image output unit 132. The image analysis unit 130 analyzes the structure of a document image and extracts necessary information from the analysis result. The image generation unit 131 digitizes an image of a document by reading (e.g., scanning) the document, generates image data, and stores it in the HDD 103. Also, the image generation unit 131 can generate document image data of another format using the information that the image analysis unit 130 analyzed. The image output unit 132 outputs the image data stored in the HDD 103 and the like. As output methods, for example, printing image data of a document onto a sheet, transmitting image data of a document to an external device, a server, a facsimile apparatus, or the like connected to a network via the communication unit 101, or storing image data of a document in a storage medium connected to the image processing apparatus 1 can be given.

<Functional Configuration of Image Processing Apparatus>

Next, an example of a functional configuration of the image processing apparatus 1 illustrated in FIG. 1 will be described with reference to FIG. 2. The image processing apparatus 1 has an authentication processing unit 201, a user information management unit 202, a job processing unit 203, an operation processing unit 204, an apparatus information management unit 205, and a job information comparison unit 206 as its functions. Each functional unit is a function that is realized by the CPU 100 deploying in the RAM 102 a program that is installed in the HDD 103 using a boot ROM of the ROM 104 and performing that program.

The authentication processing unit 201 authenticates a user that logs in to the image processing apparatus 1 in accordance with user information. For example, the authentication processing unit 201 performs authentication by comparing user identification information and a password inputted from the input unit 121 with the user information that the user information management unit 202 manages. Also, authentication processing may be performed by having a predetermined card that the user possesses inserted into a card reader (not shown) that is provided in or connected to the image processing apparatus 1 and then having information that corresponds to the aforementioned user identification information and password read out. The user information management unit 202 manages for each user the authentication information necessary for authentication processing. Generally, the user information management unit 202 manages for each user user-specific identification information for identifying the user and a password and the like associated with that identification information. Of course, the user information management unit 202 may associate and manage a user authority that indicates which function of the image processing apparatus 1 the user can use and other information such as user-specific setting information. The job processing unit 203 controls execution of a job related to services (e.g., services such as printing, copying, scanning, faxing, and sending) that the image processing apparatus 1 provides in accordance with an instruction from a logged-in user. The operation processing unit 204 functions as a display control unit and displays various kinds of information in relation to the user by controlling the display unit 120. Furthermore, the operation processing unit 204 accepts and processes an operation instruction from the user inputted from the input unit 121.

The apparatus information management unit 205 manages apparatus information related to the image processing apparatus 1. For example, an IP address assigned to the apparatus, common setting values across all users that use the apparatus, and the like are included in the apparatus information. Note that it is also possible to manage in the apparatus information management unit 205 the same kind of information as the information managed in the user information management unit 202. For example, in a case of managing user-specific setting information, the apparatus information management unit 205 presents an English message to a user in a case where a common setting for language is set to English and a user for whom language has not been set uses the apparatus. Meanwhile, the apparatus information management unit 205 presents a Japanese message in relation to another user in a case where that user has set the language to Japanese. As described above, it is possible to provide a user-friendly operation system by also managing user-specific information in the apparatus information management unit 205.

The information acquired using the sensors within the print unit 107 and the scan unit 108 are consecutively sent by communication to the apparatus information management unit 205. That information is held in the apparatus information management unit 205 and is displayed on the display unit 120 of the operation unit 12 as a notification to the user when an error has occurred or when abnormality is detected. Also, the information of a job execution button displayed on a menu screen and the like are held in the apparatus information management unit 205. This button information is information that indicates a paper size, the number of sheets, a toner amount, and the like necessary for processing at a time of executing processing for when a corresponding button is operated. Also, the apparatus information management unit 205 performs in conjunction with the addition or deletion of each job execution button addition or deletion of information associated with a corresponding job execution button and updates the managed information of the job execution button in accordance with the change of information. Here, the meaning of "change of information" includes, for example, a case where setting information has been changed in accordance with a user input and changes of user information and apparatus information such as information that accompanies addition of an option apparatus or an option function.

The job information comparison unit 206 performs comparison of the information acquired using the sensors and the button information managed by the apparatus information management unit 205 and determines whether or not the current state of the apparatus is sufficient for performing job execution. In a case where it is determined insufficient, a difference between the button information and the information acquired using the sensors are obtained and the information is presented in association with the execution button. Details will be described later using FIG. 3.

<Display Example of Execution Button>

Next, a display example of an execution button according to the present embodiment will be described with reference to FIG. 3. A reference numeral 301 indicates a button for executing a job of a service that the image processing apparatus 1 provides to be displayed on a menu screen and the like. For example, in a case where an execution button 301 is displayed within a menu screen displayed on the touch-panel-type display unit 120, the user can instruct execution of a job that is set for each button by pressing within a frame of the execution button 301. A reference numeral 302 is a mark that indicates an execution button and indicates that after a button on which the aforementioned mark is displayed has been pressed, a job instruction is sent and job processing is performed in the job processing unit 203. A reference numeral 303 indicates an icon of an execution button. The icon 303 generally indicates what kind of a job the job to be executed in association with a corresponding execution button is. Regarding the icon 303, it is possible that the user sets it. A reference numeral 304 is an execution button name and generally indicates in a text string what kind of a job the button performs. Regarding this too, the user can set so as to distinguish it from other buttons. A reference numeral 305 is a message box and when an error is detected, information regarding a related error is displayed within this box.

<Screen Transitions Other than Execution Buttons>

Figure 4:
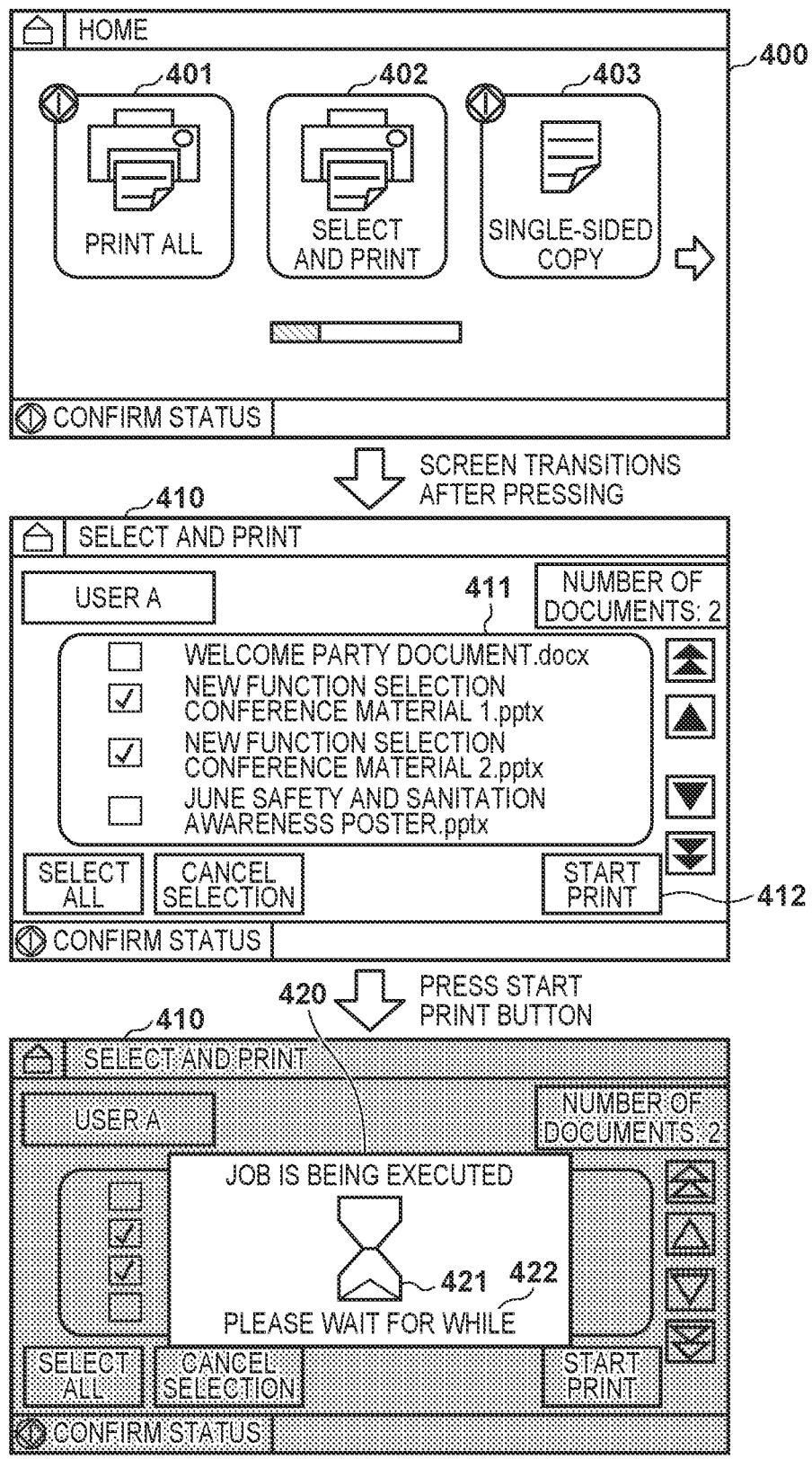
FIG. 4 is a view illustrating a transition from a home screen according to the embodiment.

Next, screen transitions for when buttons that are not execution buttons have been pressed in the image processing apparatus 1 in the present embodiment will be described with reference to FIG. 4. A reference numeral 400 indicates a home screen (menu screen). The home screen 400 is configured to include a button 402 which is different from execution buttons such as the respective execution buttons 401 and 403 described in FIG. 3. Furthermore, a confirm status region on which to display status information of the image processing apparatus 1 is included in the home screen 400.

When the user presses the execution button 401, 403, or the button 402, an app associated with a corresponding button is executed. In the example of FIG. 4, the button 402 executes an app that performs "select and print". Specifically, when the button 402 is pressed on the home screen 400, a "select and print" app screen 410 is transitioned to from the home screen 400.

In the screen 410, at least a list 411 of selectable print materials and a start print button 412 are included. In the screen 410, the user can select whether or not to print in relation to each print material displayed in the list 411. For example, the user can select a print material by inputting a check in a checkbox. Printing can be started when the start print button 412 is pressed in a state in which a check has been inputted for any of the print materials. As described above, by virtue of the present embodiment, buttons other than execution buttons such as the button 402 execute jobs after further selection and setting are performed whereas the execution buttons 401 and 403 execute corresponding jobs when pressed.

When the start print button 412 is pressed, the screen 410 is temporarily displayed in a grayout and a message box 420 is displayed superimposed as a pop-up screen that indicates that print processing in progress on the screen 410. In the message box 420, an icon 421 and a message 422 that indicate the current status are displayed, that operation is currently in progress is indicated, and that it takes time is displayed. When the printing ends, the apparatus information management unit 205 notifies that the printing has ended in the message box 420 and, for example, causes transition to the home screen 400.

<Screen Transitions of Execution Buttons>

Figure 5:
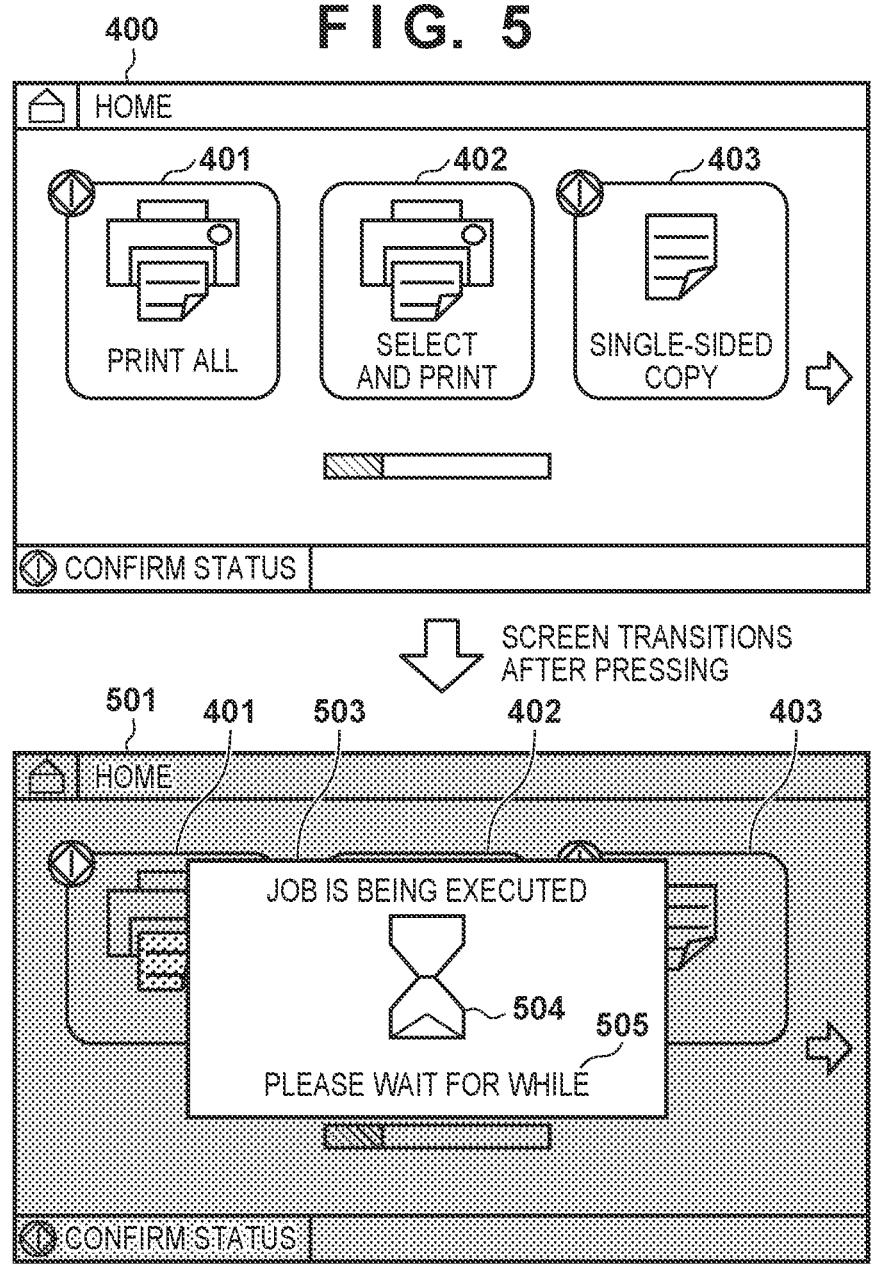
FIG. 5 is a view illustrating a transition from the home screen according to the embodiment.

Next, screen transitions for when execution buttons according to the present embodiment have been pressed will be described with reference to FIG. 5. FIG. 5 illustrates a screen transition in a case where the execution button 401 has been pressed on the home screen 400. When the execution button 401 is pressed by the user, an app associated with that button is executed with a preset setting value. The example of FIG. 5 illustrates an example of a screen transition for when the user has pressed the "print all" execution button 401 on the home screen 400, and transition is made to a screen 501. Specifically, when the execution button 401 is pressed, the home screen 400 is temporarily displayed in a grayout and a message box 503 is displayed superimposed as a pop-up screen that indicates that print processing in progress on the screen 400. In the message box 503, an icon 504 and a message 505 that indicate the current status are displayed, that operation is currently in progress is indicated, and that it takes time is displayed. When the printing ends, the apparatus information management unit 205 notifies in the message box 503 that the printing has ended and hides the message box 503 displayed superimposed on the home screen 400. In a case where an execution button has been selected as described above, an app associated with that execution button is executed and job execution is started by that app unlike the above button 402. In other words, the execution buttons 401 and 403 are buttons that directly instruct a start of a job from the home screen 400.

<Processing Procedure>

Figure 6:
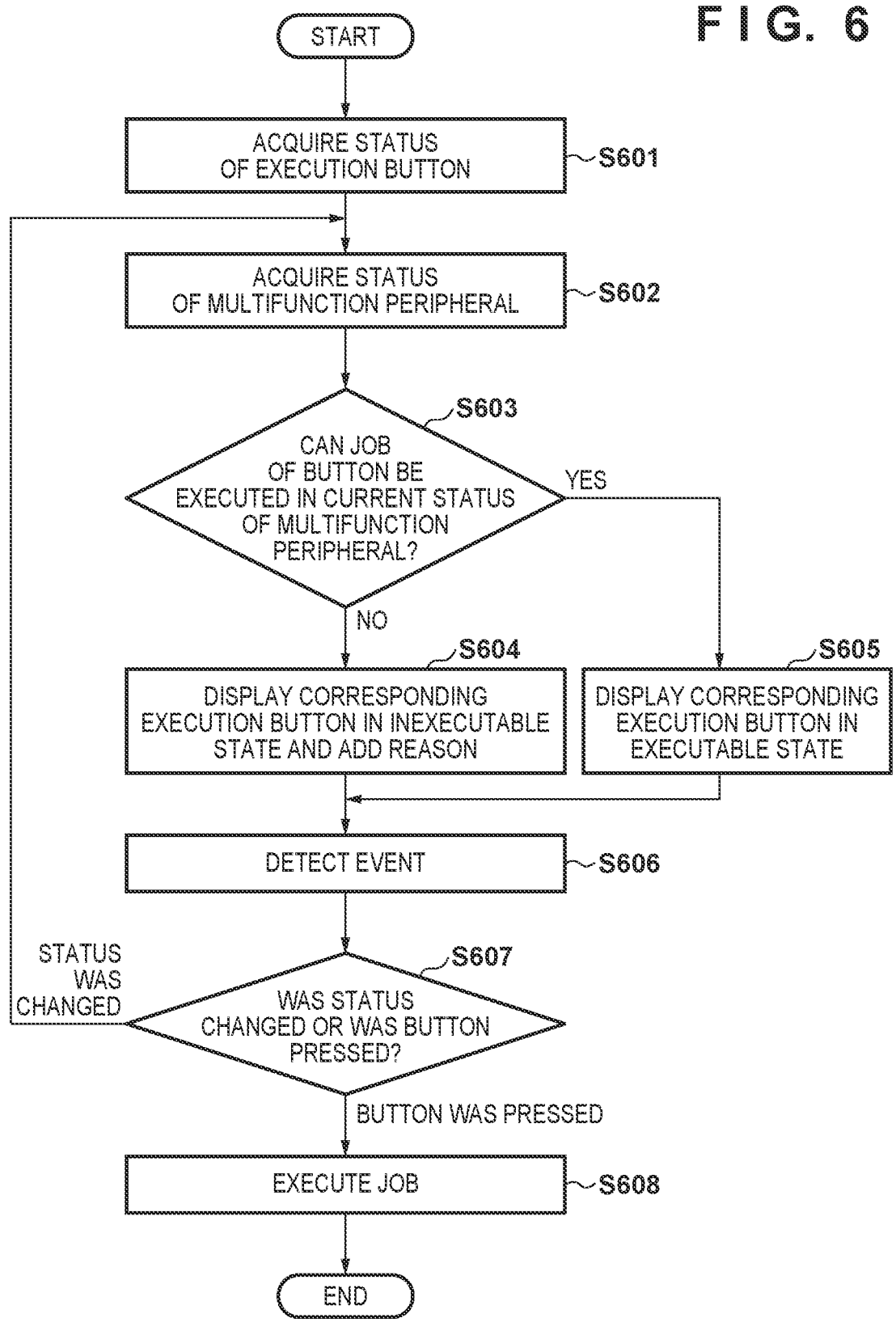
FIG. 6 is a flowchart illustrating a processing procedure of the image processing apparatus 1 according to the embodiment.
Figure 7:
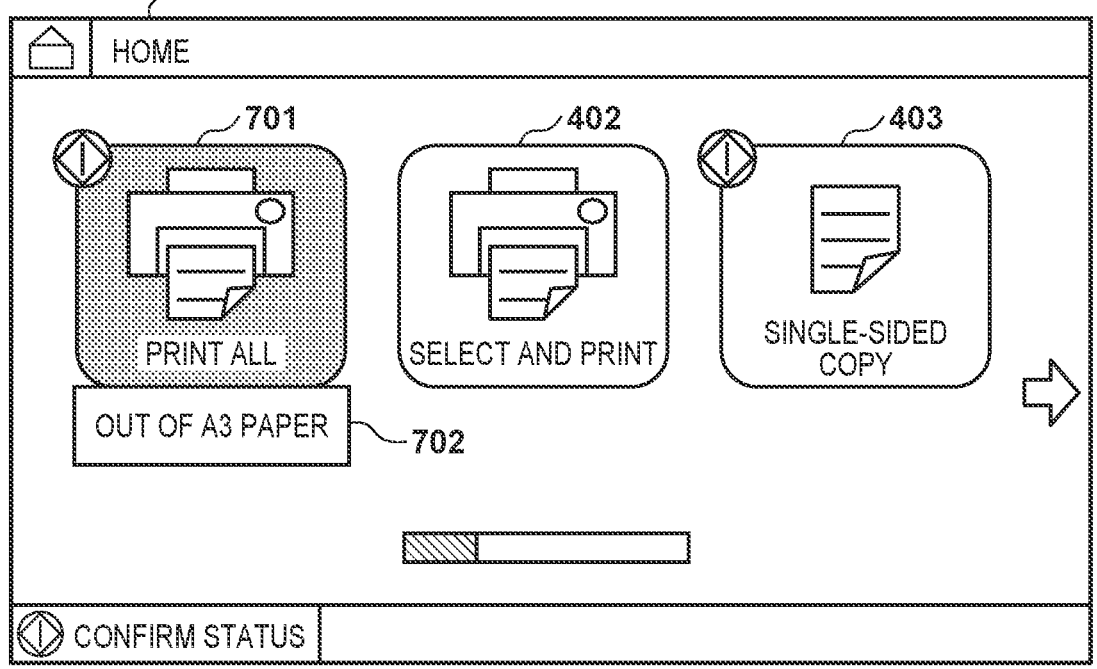
FIG. 7 is a view illustrating an example of a screen for when an error has occurred according to the embodiment.

Next, a processing procedure for when an image illustrated in FIG. 7 is displayed will be described with reference to FIG. 6. Also, the processing described below is realized by, for example, the CPU 100 reading out to the RAM 102 and executing a control program stored in the HDD 103 or the ROM 104. Also, each of the processing will be executed respectively by any of the authentication processing unit 201, the user information management unit 202, the job processing unit 203, the operation processing unit 204, the apparatus information management unit 205, and the job information comparison unit 206.

In step S601, the job information comparison unit 206 acquires information related to a controlled execution button managed in the user information management unit 202. The information related to a controlled execution button is information automatically generated using information that the user has set in the past, frequency analysis, and the like. FIG. 7 illustrates a home screen 700 that displays error information by an execution button. Reference numerals 701 and 403 are execution buttons on the home screen 700. Here, the information acquired in step S601 is different for each app. An example is as in Table 1.

TABLE 1

| | List of Information Acquired from Execution Button (C102) | |
|---|---|---|
| App Name (C101) | Toner Amount (C102) | Number of Sheets for Each Size (C104) |
| Copy | ○ | ○ |
| Print | ○ | ○ |
| Receive Fax Print | ○ | ○ |
| Scan and Print | × | × |

Each row corresponds to individual apps, and each column represents what information to acquire for each app from the user information management unit 202. An app name C101 is a name of an app that gives an execution instruction when an execution button is pressed. Reference numeral C102 represents lists of information acquired from an execution button. In reference numerals C103 and C104, whether or not the information is used for determination of whether or not the execution button can be executed is represented. For example, for the execution button whose app to be used is "copy", the size and the necessary number of sheets of paper on which to output read data are calculated and a toner usage amount that is sufficient for the printing are calculated based on this information. In a case where a corresponding app acquires information of the reference numerals C103 and C104, a target column takes on "○". Meanwhile, in a case of an app whose target column is "×", the corresponding information will not be a determining factor of whether or not execution is possible; accordingly, acquisition of the corresponding information is not performed. For example, in a case of executing a "scan and transmit" app, toner and sheets are consumables that are not used even if the job is executed: accordingly, they will not be a determining factor of execution capability. Note that an app associated with an execution button may be of a plurality. In such a case, information to be acquired for that execution button is acquired for each individual app.

In the home screen 700, it is assumed that a job that prints using A3 paper and a job that prints using A4 paper are accumulated in "print all" of an execution button 701. Also, a state in which an input value of an app is set such that output paper is A4 paper in "single-sided copy" of an execution button 403 is assumed. In this state, a "print" app is used in relation to the execution button 701; accordingly, the job information comparison unit 206 acquires from the user information management unit 202 a setting value of a toner usage amount and the size/number of sheets to be used for each printing using Table 1. A "copy" app is used in relation to the execution button 403; accordingly the job information comparison unit 206 acquires from the user information management unit 202 a setting value of a toner usage amount and the size/number of sheets to be used for printing using Table 1. Note that an example in which information is acquired from the user information management unit 202 was described here; however, there is no intention to limit the present invention, and information may be acquired from the apparatus information management unit 205 or another management unit depending on the information.

Also in the home screen 700, "select and print" of the button 402 is not an execution button, there is a screen transition after pressing, and after a user has selected a job, processing in a corresponding app is performed. Accordingly, the button 402 is not a target of the processing in step S601 unlike an execution button. An operation for when the button 402 has been pressed has already been described using FIG. 4; accordingly, detailed description will be omitted.

Next in step S602, the job information comparison unit 206 acquires current status information of the image processing apparatus 1 managed in the apparatus information management unit 205. The information to be acquired at this time is indicated in Table 2.

TABLE 2

| | List of information Acquired from Execution Button (C102) | | | |
|---|---|---|---|---|
| App Name (C101) | Toner Amount (C102) | Number of Sheets for Each Size (C104) | App Usage Authority (C205) | Intradevice Error Information (C206) |
| Copy | ○ | ○ | ○ | ○ |
| Print | ○ | ○ | ○ | ○ |

TABLE 2-continued

List of information Acquired from Execution Button (C102)

| App Name (C101) | Toner Amount (C102) | Number of Sheets for Each Size (C104) | App Usage Authority (C205) | Intradevice Error Information (C206) |
|---|---|---|---|---|
| Receive Fax Print | ○ | ○ | ○ | ○ |
| Scan and Print | × | × | ○ | ○ |

Each row corresponds to an individual app, and each column represents information that the job information comparison unit 206 acquires from the apparatus information management unit 205 for the app of each execution button. An app name C201 is a name of a transmission destination application to which an execution instruction is transmitted when an execution button is pressed.

Reference numeral C202 represents lists of device information that the job information comparison unit 206 acquires from the apparatus information management unit 205. Reference numerals C203 and C204 included in the device information is information that is referenced when determining execution capability of corresponding processing when an execution button is pressed. For example, information of the "remaining amount of toner" and the "number of sheets for each size" is referenced for the "copy" app execution button. Meanwhile, this information is not necessary for determination of execution capability for the "scan and transmit" app execution button; accordingly, it is not referenced.

Also, the job information comparison unit 206 acquires information of reference numerals C205 and C206 from the apparatus information management unit 205 together with the above. The reference numeral C205 indicates app usage authority and is acquired from the user information management unit 202. The reference numeral C206 indicates whether or not there is error information of the multifunction peripheral and is acquired from the apparatus information management unit 205. The reference numeral C206 may be whether or not there is error information in the entire multifunction peripheral or whether or not there is error information that relates to an app for which an execution button was selected.

When the execution button 701 is selected on the home screen 700 of FIG. 7, "print" app processing is executed. Also, when the execution button 403 is selected, "copy" app processing is executed. Accordingly, the job information comparison unit 206 acquires from Table 2 the "remaining toner amount", the "number of sheets for each size", the "app usage authority" and the "device error information" when determining execution capability for the execution button 701. Also, the job information comparison unit 206 acquires the "remaining toner amount", the "number of sheets for each size", the "app usage authority" and the "device error information" when determining execution capability for the execution button 403.

The description of FIG. 6 is returned to. In step S603, the job information comparison unit 206 performs comparison of information collected in steps S601 and S602. In other words, the job information comparison unit 206 compares the "toner usage amount" and the "number of sheets for each size" that become necessary in a case where a target execution button is pressed and the "remaining toner amount" and the "number of sheets for each size" that were acquired as apparatus information and exist in the apparatus and determines execution capability of a target job. At that time, the job information comparison unit 206 acquires from the user information management unit 202 the information of the app usage authority (C205), acquires from the apparatus information management unit 205 the information of the intradevice error information (C206), and determines target job execution capability based on this information. For example, there are cases where in a case where a user B executes the execution button that an administrator A has set, there is no authority of an app to be used by the execution button for the user B; accordingly, it is necessary to acquire the authority of the user B and determine execution capability. In addition to the above, the job information comparison unit 206 determines execution capability by confirming whether or not an error that relates to an app has occurred.

In the determination of step S603, it is advantageous to disable the usage of a corresponding execution button also in a case where some of the job cannot be executed. For example, in a case where there are 9 executable jobs and 1 inexecutable job accumulated in the "print all" execution button 701, the job information comparison unit 206 determines that the job is in an inexecutable state and advances the processing to step S604. Meanwhile, in a case where it is determined in step S603 that a job can be executed, the processing is advanced to step S605 so as to display the execution button in a selectable state. Note that in the comparison in step S603, in a case where a target execution button instructs a plurality of jobs, the comparison is performed for each app and if there is insufficient information/authority and related error information, this information will be presented in step S604 described later.

In step S604, the operation processing unit 204 displays the execution button 701 in a grayout in a case where it is determined that job execution is not possible based on the determination result by the comparison in step S603 and adds and displays a reason why execution is not possible including status information under the execution button 701. Then the processing is advanced to step S606. This reason why execution is not possible may be in a form that is stored in a memory or the like as text in advance and displayed when a corresponding error has occurred or may be in a form that embeds in relation to predecided text the information that the apparatus information management unit 205 manages when an error has occurred. In the example of FIG. 7, a print job that uses A3 paper is accumulated in a print app that corresponds to the execution button 701. In such a case, the job information comparison unit 206, in a case where A3 paper is not set in the image processing apparatus 1 or in a case where the set A3 paper is insufficient, determines that job execution by the execution button 701 is not possible due to insufficiency of A3 paper. Accordingly, the operation processing unit 204 displays that A3 paper is insufficient as an error message 702 in a region under (near) the execution button 701. Also, the operation processing unit 204 changes the execution button 701 to unselectable such that processing is not executed even if the execution button 701 is selected and displays it. In the example of FIG. 7, a form in which the execution button 701 is displayed in a grayout is illustrated. Note that there is no intention to limit the present invention and an execution button may be displayed in any form so long as the form causes the user to recognize that the execution button is in a state in which it is unselectable. Meanwhile in step S605, the operation processing unit 204, in a case where it is determined that job execution is possible based on the determination result by the comparison in step S603, displays the execution button without graying it out and advances to step S606. In the example of FIG. 7, the execution button 403 is displayed without the error message 702 unlike the execution button 701 and without being grayed out.

In step S606, the operation processing unit 204 waits until an event is detected. Here, the event refers to either an event that indicates that the user has replenished paper/toner or other error factors have been resolved (an event that indicates that a status has been changed) or an event that indicates that an execution button has been selected. When an event is detected, the processing advances to step S607 and the operation processing unit 204 determines whether the event is that in which a status of the image processing apparatus 1 has been changed or any of execution buttons has been selected. In a case where an event that indicates that an error factor has been resolved is detected, the processing is returned to step S602 so as to acquire the status information of the multifunction peripheral again and update a display of the execution button. Meanwhile, in a case where the user has pressed the execution button and performed a job execution instruction, the processing is advanced to step 608 in order to perform a corresponding execution job.

In step S608, the job processing unit 203 executes corresponding job processing and ends the processing flow. Meanwhile, in a case where the processing was returned to step S602, status information of the image processing apparatus 1 is acquired again, the comparison in step S603 is performed with the information after the event was detected, execution capability of each execution button is determined, and a display form of the execution buttons are updated as necessary. For example, in a case where A3 paper has been replenished by the user, the operation processing unit 204 does not gray out the execution button 701 and displays it to be selectable, and changes the display of the error message 702 to hidden.

As described above, the image processing apparatus according to the present embodiment comprises the display unit 120 that displays an operation screen and acquires current status information of the image processing apparatus in addition to acquiring information related to an execution button of a job included in the operation screen. Also, the image processing apparatus compares the acquired information related to the execution button and status information and determines execution capability of a job to be executed when the execution button has been operated. Furthermore, the image processing apparatus controls based on the determination result the display of each execution button included in the operation screen such that the execution capability status is recognizable. By this, the user can easily recognize whether or not the execution button is in an executable state before pressing the execution button. Furthermore, in a case where it is not operative, it is possible to prompt the user for replenishment action, error processing, or error evasive action by presenting to the user insufficiency information such as an error message and the user can preemptively avoid an error that would have occurred before operating the corresponding execution button.

Second Embodiment

A second embodiment of the present invention will be described below. In the above first embodiment, the method of grayout and error messages were used to indicate to the user that execution of a job associated with an execution button is in an impossible state. However, in the present embodiment, mask processing that indicates a status display superimposed above each execution button so as to cover it is used as a variation of the above method. By this, the execution capability status of the execution button is presented to the user in the present embodiment. Note that in the present embodiment, the same reference numerals are added to configurations and control that are the same as the above first embodiment, and description will be omitted.

<Masking>

Figure 8:
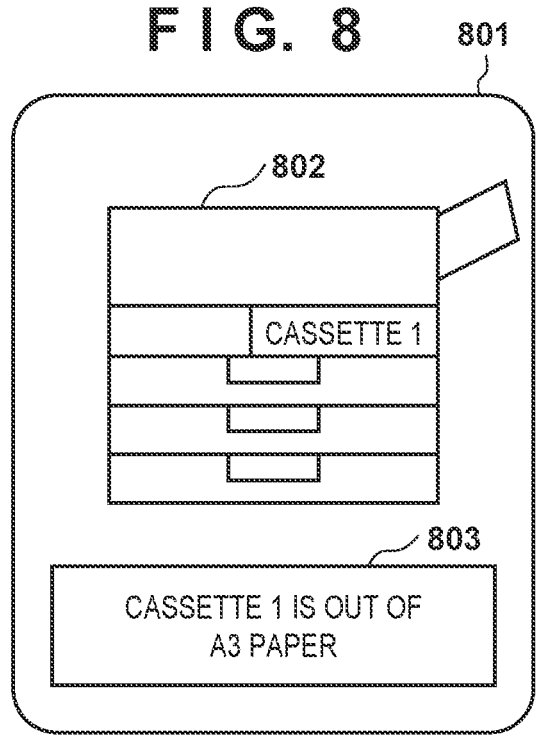
FIG. 8 is a view illustrating an example of masking according to the embodiment.

Next, an example of masking according to the present embodiment will be described with reference to FIG. 8. Reference numeral 801 is a mask display that is displayed on the home screen and the like. In the above screen, the above mask display 801 is displayed superimposed above the execution button; however, job execution will not be performed even if the user presses within a frame of the mask display or within a frame of the execution button. Reference numeral 802 is a display that indicates a sheet feeding cassette of the image processing apparatus 1 and is displayed in a case where sheets of a size to be used in a job to be executed by the corresponding execution button being operated is less than the necessary number of sheets. In other words, an icon that indicates an error portion that is causing the execution button to not be executable is displayed and in the example of FIG. 8, an icon that indicates the sheet feeding cassette is displayed. In the example of FIG. 8, a text string of "cassette 1" in which A3 paper is stacked is displayed at a position of the corresponding cassette. By this, the user can easily determine in which cassette to replenish the A3 paper. Reference numeral 803 is a message box and when an error is detected, information regarding a related error is displayed. In the example of FIG. 8, a message of "cassette 1 is out of A3 paper" is displayed.

<Processing Procedure>

Figure 9:
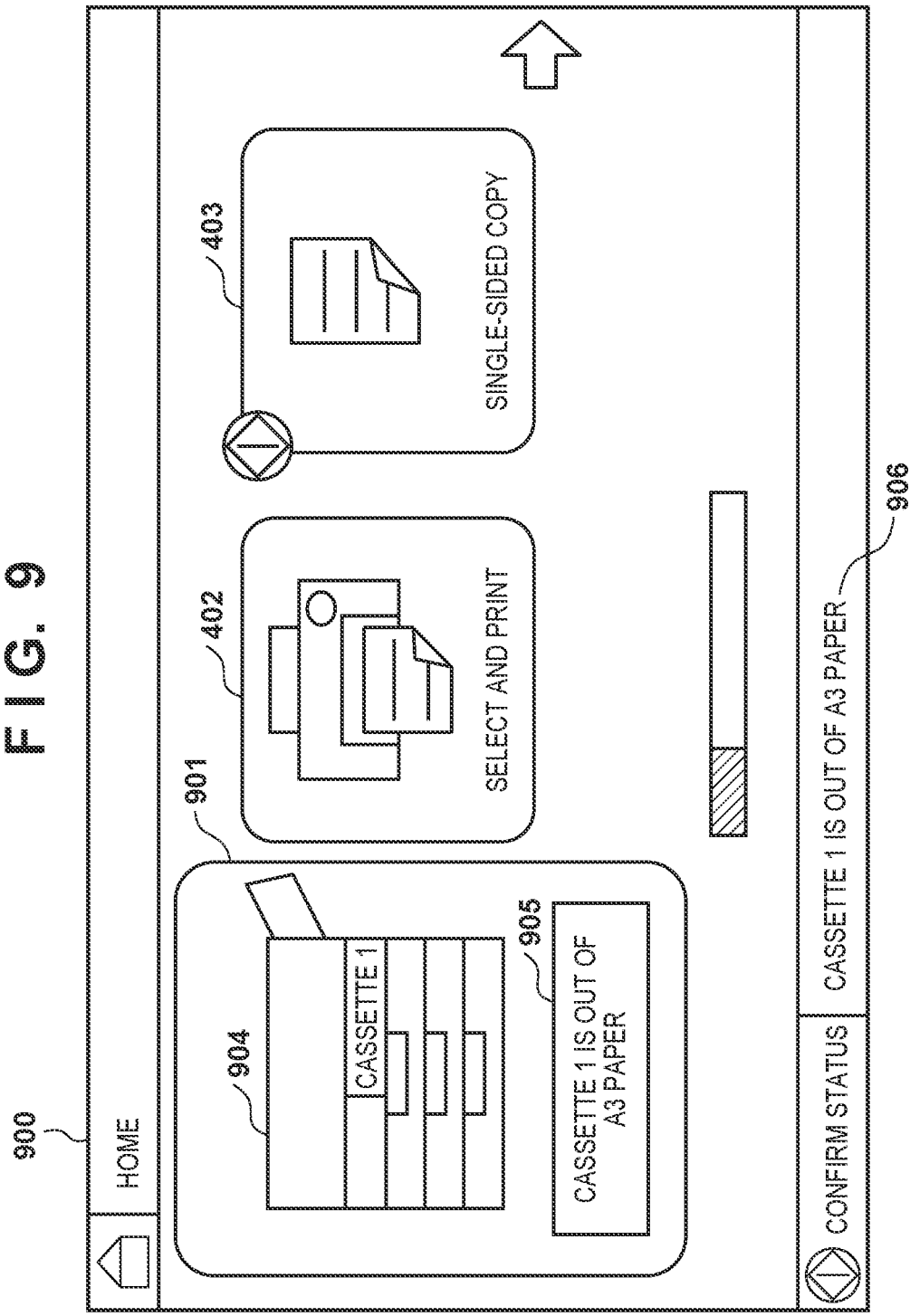
FIG. 9 is a view illustrating an example of a screen for when an error has occurred according to the embodiment.
Figure 10:
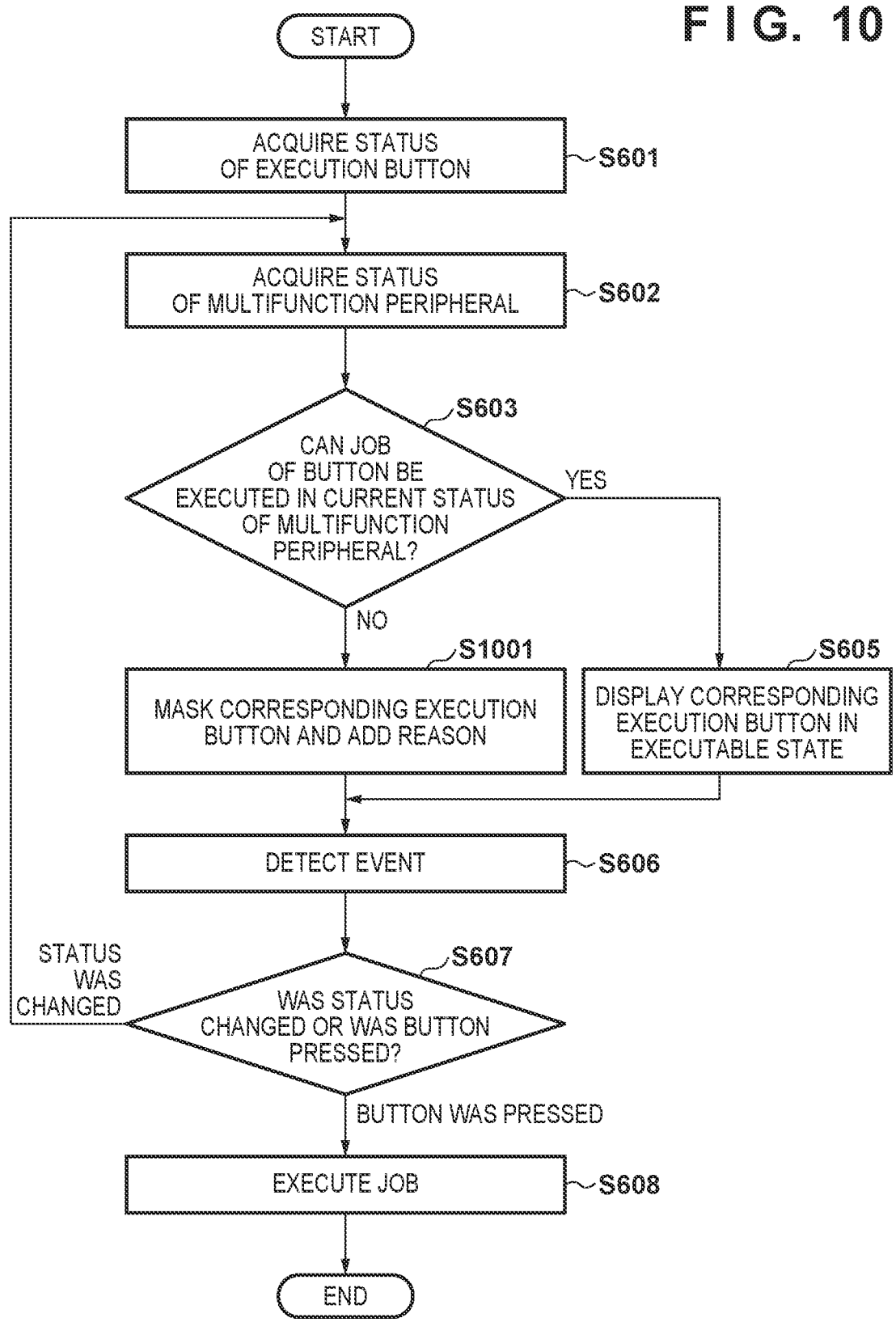
FIG. 10 is a flowchart illustrating a processing procedure of the image processing apparatus 1 according to the embodiment.

A processing procedure according to the present embodiment will be described with reference to a flowchart of FIG. 10. Here, description for processing details for when a home screen 900 illustrated in FIG. 9 is displayed will be given. The processing described below is realized by, for example, the CPU 100 reading out to the RAM 102 and executing a control program stored in the HDD 103 or the ROM 104. Also, each of the processing will be executed respectively by any of the authentication processing unit 201, the user information management unit 202, the job processing unit 203, the operation processing unit 204, the apparatus information management unit 205, and the job information comparison unit 206. Note that the same step numeral is added to the processing that is the same as the flowchart of FIG. 6 and description will be omitted. The point of difference is that step S1001 is executed in place of step S604. Also, in the home screen 900, the same reference numeral is added to the display that is the same as the home screens 400 and 700.

In step S1001, the operation processing unit 204, in a case where it is determined that job execution is not possible based on the determination result by the comparison in step S603, adds a reason why job execution is not possible in addition to positioning a mask display 901 that covers the entire target execution button above the home screen 900. In the home screen 900, the execution button 401 of "print all" illustrated in FIG. 4 is determined to be inexecutable and the mask display 901 is displayed superimposed so as to cover the display of the execution button of a corresponding portion. Furthermore, within the mask display 901, an icon 904 that indicates an error portion and an error message 905 that adds a reason for inexcusability is displayed. Furthermore, the operation processing unit 204 may display the same error message 906 also in a region in which the status information of the apparatus is displayed. Note that in this region that displays the status information of the apparatus, information that is not related to execution of individual jobs is displayed. Accordingly, in a case where, for example, there is no execution button that uses A3 paper, all execution button is displayed in a form in which they are executable; meanwhile, the error message 906 is displayed in the status information of the apparatus. Of course, the error message 906 may be displayed on the home screen 70) in the above first embodiment. Note that when the error factor is resolved, the operation processing unit 204 changes the mask display 901 to hidden as described using FIG. 6 and displays the target execution button in an executable form.

As described above, the image processing apparatus according to the present embodiment displays the mask display superimposed on an execution button whose job is determined to be inexecutable so as to cover that execution button. In that mask display, an icon that indicates an error portion that is causing the job to not be executable and an error message that indicates the cause may be included. By this, the image processing apparatus according to the present embodiment can achieve the same effect as the above first embodiment.

The present invention is not limited to the above embodiments and various changes and modifications can be made within the spirit and scope of the present invention. Therefore, to apprise the public of the scope of the present invention, the following claims are made.

By virtue of the present invention, it is possible to suitably indicate an execution capability status of a button that executes a function on an operation screen and for the user to easily determine whether or not an execution button is operative.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-104746, filed Jun. 17, 2020, which is hereby incorporated by reference herein in its entirety.

What is claimed is:

1. An image processing apparatus comprising:
at least one memory device that stores a set of instructions; and
at least one processor that executes the set of instructions to:
display an operation screen wherein the operation screen includes a first job execution button for executing a job based on selection and a second job execution button for displaying a setting screen of a job based on selection:
acquire status information of the image processing apparatus, and
execute display control for the first job execution button based on the acquired status information, and not execute the display control for the second job execution button based on the acquired status information,
wherein in a case where a job corresponding to the first job execution button cannot be executed, a display indicating an error for the first job execution button is executed, and in a case where a job corresponding to the second job execution button cannot be executed, a display indicating an error for the second job execution button is not executed.

2. The image processing apparatus according to claim 1, wherein the at least one processor executes instructions in the memory device to:
display, in a selectable state, the first job execution button for which execution of a job is determined to be possible based on the acquired status information.

3. The image processing apparatus according to claim 1, wherein the at least one processor executes instructions in the memory device to:
display, in a non-selectable state, the first job execution button for which execution of a job is determined to be not possible and display an error message that indicates a reason the job cannot be executed near the first job execution button.

4. The image processing apparatus according to claim 3, wherein the at least one processor executes instructions in the memory device to:
display the first job execution button in a non-selectable state in grayout.

5. The image processing apparatus according to claim 1, wherein the at least one processor executes instructions in the memory device to:
display a mask display to be superimposed over the first job execution button for which execution of a job is determined to be not possible so as to cover the first job execution button.

6. The image processing apparatus according to claim 5, wherein in the mask display, an icon that indicates an error portion that is a reason a job cannot be executed and an error message that indicates that reason are included.

7. The image processing apparatus according to claim 1, wherein a predetermined mark is displayed on the first job execution button, and the predetermined mark is not displayed on the second execution button.

8. The image processing apparatus according to claim 1, wherein the first job execution button is a button that executes a plurality of jobs when operated, and
the at least one processor executes instructions in the memory device to: in a case where at least one job of a plurality of jobs cannot be executed, determine that execution of a job to be executed when the first job execution button is operated is not possible.

9. The image processing apparatus according to claim 1, wherein the at least one processor executes instructions in the memory device to:
when a reason thereof is resolved, updates to display, in a selectable state, the first job execution button for which execution of a job is determined to be not possible.

10. The image processing apparatus according to claim 1, further comprising:
one or more sensors configured to detect a status of the image processing apparatus.

11. The image processing apparatus according to claim 10,
wherein in the one or more sensors, a sensor that can detect the number of sheets stacked in a sheet feeding cassette and a sensor that detects a remaining toner amount are included.

12. The image processing apparatus according to claim 1, wherein the first job execution button is a button that immediately executes a job when pressed.

13. The image processing apparatus according to claim 1, wherein
the first job execution button and the second job execution button are a button for executing a first function.

14. The image processing apparatus according to claim 1, wherein
the first job execution button and the second job execution button are a button for executing a first function, and
the at least one processor executes instructions in the memory device to:
in a case where the first function cannot be executed, a display indicating an error for the first job execution button, and not execute a display indicating an error for the second job execution button.

15. The image processing apparatus according to claim 1, wherein
the display control includes at least one of a gray-out display of the first job execution button and a display indicating an error for the first job execution button.

16. The image processing apparatus according to claim 1 wherein
the acquired status information includes at least one of a toner remaining amount, a number of sheets for each size, and error information.

17. The image processing apparatus according to claim 1 wherein
the display control comprises executing a display indicating whether or not the first job execution button is an executable state.

* * * * *